UNITED STATES PATENT OFFICE.

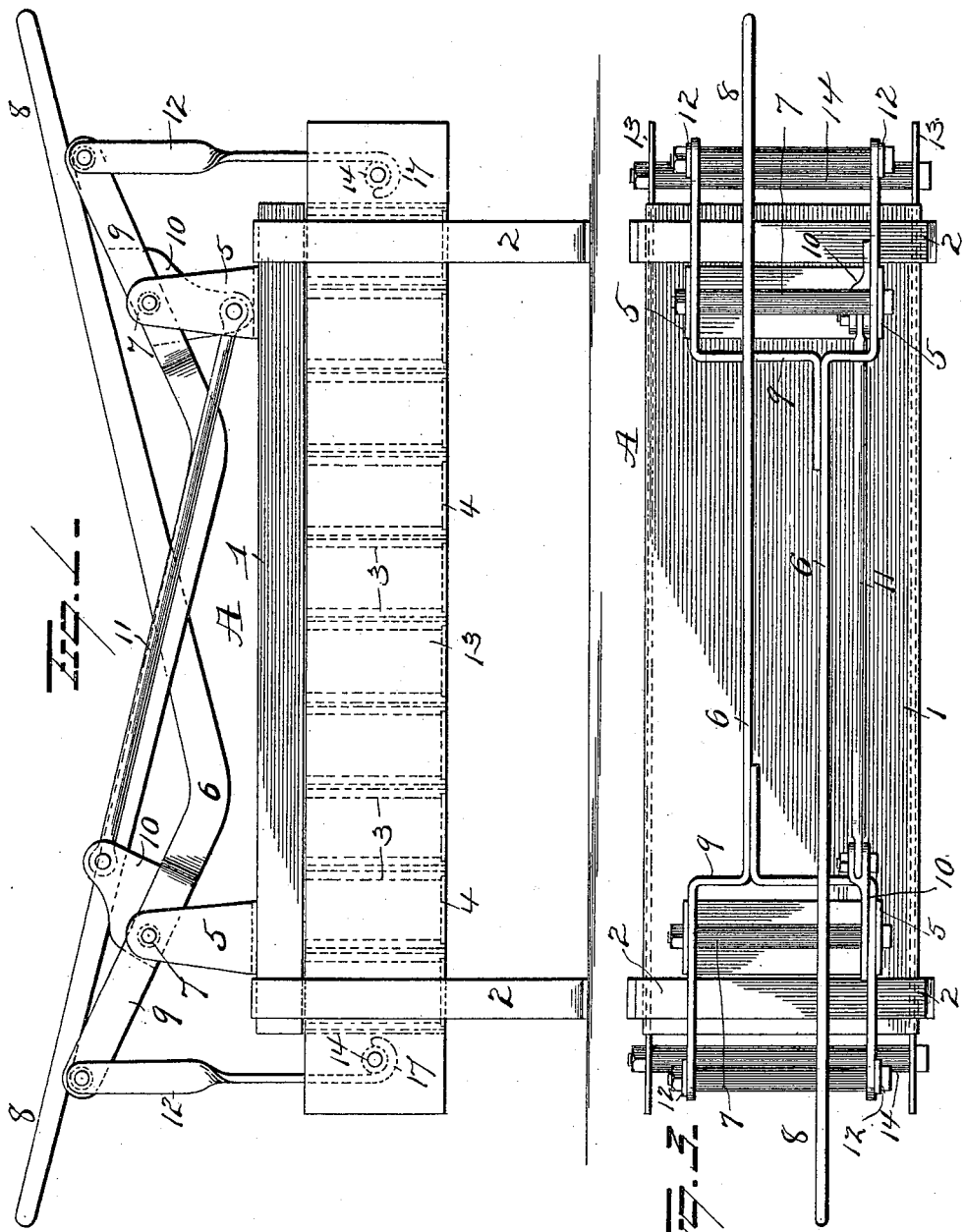

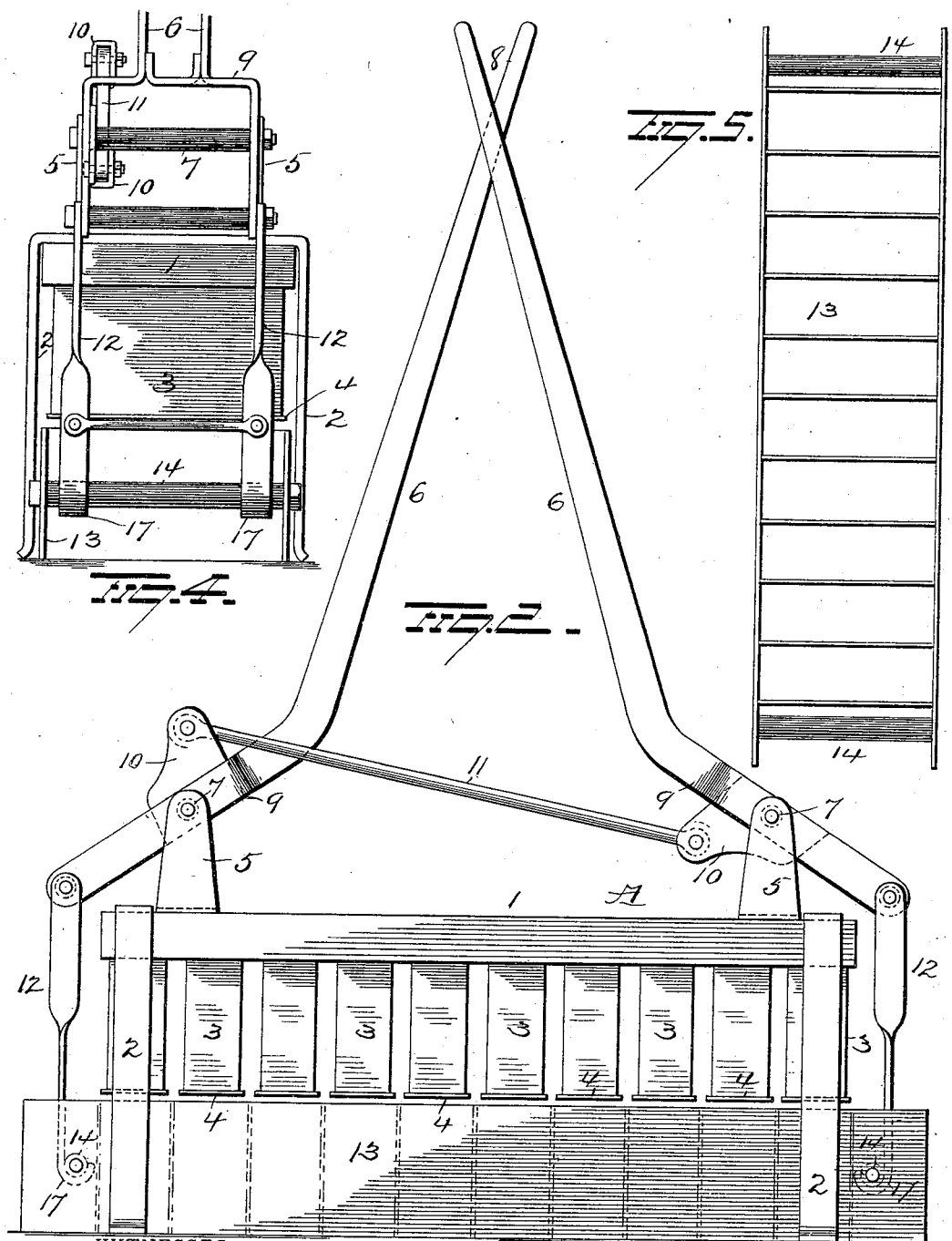

HENRY B. SPERRY, OF AKRON, OHIO.

MACHINE FOR MAKING BRICKS.

SPECIFICATION forming part of Letters Patent No. 641,341, dated January 16, 1900.

Application filed April 28, 1899. Serial No. 714,875. (No model.)

*To all whom it may concern:*

Be it known that I, HENRY B. SPERRY, of Akron, in the county of Summit and State of Ohio, have invented certain new and useful Improvements in Machines for Making Bricks; and I do hereby declare the following to be a full, clear, and exact description of the invention, such as will enable others skilled in the art to which it appertains to make and use the same.

My invention relates to an improvement in portable brick-machines, the object being to provide a simple, durable, and inexpensive machine for the manufacture of bricks, briquets, tiling, and other similar articles from any suitable material—such as ordinary brick-clay, fire-clay, silica, magnesite, and iron-ore flue-dust; and it consists in certain novel features of construction and combinations of parts, as will be hereinafter more fully described, and pointed out in the claims.

In the accompanying drawings, Figure 1 represents a view in side elevation of my improved machine, the mold being represented in its highest position. Fig. 2 is a similar view, the mold being shown in its lowest position. Fig. 3 is a top plan view. Fig. 4 is a view in end elevation, and Fig. 5 is a plan view of the portable mold.

A represents a supporting frame or table consisting of a top 1, preferably constructed of wood, supporting-legs 2 2, arranged in pairs and disposed at the opposite ends of said top, the legs of each pair being preferably made in a single piece and in the form of an inverted U, the horizontal member thereof extending across the upper face of top 1, and a series of downwardly-projecting blocks 3, disposed at intervals along the bottom face of top 1, the lower faces of said blocks being faced with steel, as shown at 4.

Each end of top 1 is provided with a pair of oppositely-located fulcrums 5 5, to which the hand-levers 6 6 are pivotally secured, the connection being effected by the shafts 7 7. The levers 6 6 each comprise a handle-section 8 and a slightly bent or curved section 9, which latter section is preferably U or forked shape, and in this section the pivotal connection above described is made. Each lever 6 6 is provided at or near its pivotal point and on but one side with a bracket 10, the bracket of one lever projecting in an upward direction, while the bracket of the other lever projects downwardly, said brackets being pivotally connected together with a link or rod 11.

On the free ends of sections 9 9 of levers 6 6 are loosely mounted the upper ends of links 12 12. These links extend well down toward the floor-line and are provided with hook-shaped lower ends 17 for the purpose of engaging rungs 14 14 of mold 13, as will now be explained.

The mold 13 may be made from any suitable material and may be divided into any number of compartments, the size, shape, and number of compartments varying according to the article to be made. The ends of said mold are provided with rungs 14 14, under which latter the hooked ends 17 of links 12 12 are adapted to pass when said mold is to be elevated to the position shown in Fig. 2.

The material from which the articles are to be molded is put into the several compartments of the mold 13, preferably in a moist condition, so that every corner is filled. The top is then leveled off flush, after which the mold is conveyed to the drying-floor and the supporting frame or table placed over it, as shown in Fig. 2. The links 12 12 are secured under the rungs 14 14 of the mold, and by pulling the levers together or toward each other the mold will be lifted off the brick, the blocks 3 centering the compartments of the mold and serving to hold the bricks or other articles in place or against upward movement during the ascent of the mold, or, in other words, the blocks 3 act as stops and tend to force the contents from the mold as the latter moves upwardly. The mold 13 in its ascent passes between and contacts with the inner faces of legs 2 2, the latter serving as guides to center or register the blocks 3 with the compartments formed in said mold.

While I have not shown nor described any particular means for attaching blocks 3 to top 1, it is evident that they may be attached in many different ways, and their shape and size may be varied to suit the size and shape of the compartments of the mold to be operated upon. It is also evident that other slight changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. The combination with an elevated table and a series of plungers depending therefrom, of levers pivotally mounted near their lower ends upon the ends of said table, and links depending from the free ends of the short arms of said levers and constructed at their lower ends to be removably connected with a mold disposed under the same.

2. The combination with an elevated table and a series of plungers depending therefrom, of levers pivotally mounted near one end upon the respective ends of the table, links depending from the short arms of the respective levers and adapted at their lower ends for attachment to a mold, arms projecting in opposite directions from the respective levers and a rod connecting said arms.

3. The combination with an elevated table and a series of plungers depending therefrom, of levers pivotally mounted on the table, the short arms of the levers projecting beyond the ends of the table, links depending from the ends of the short arms of said levers and adapted at their lower ends for attachment to a mold and means connecting said levers and arranged to cause them to move in unison.

In testimony whereof I have signed this specification in the presence of two subscribing witnesses.

HENRY B. SPERRY.

Witnesses:
F. H. ADAMS,
H. J. BLACKBURN.